United States Patent

[11] 3,613,895

[72] Inventor Mark E. Larkin
Bartlesville, Okla.
[21] Appl. No. 788,535
[22] Filed Jan. 2, 1969
[45] Patented Oct. 19, 1971
[73] Assignee Phillips Petroleum Company

[54] MAGNETIC TAPE HOLDER
6 Claims, 11 Drawing Figs.

[52] U.S. Cl. .......... 211/40, 312/8
[51] Int. Cl. .......... A47g 29/00
[50] Field of Search .......... 211/40, 126, 170; 312/8

[56] References Cited

UNITED STATES PATENTS

| | | | |
|---|---|---|---|
| 1,004,281 | 9/1911 | Kuhn | 211/40 |
| 1,361,824 | 12/1920 | Bugbee | 206/72 |
| 1,429,076 | 9/1922 | Helsley | 312/12 |
| 1,878,659 | 9/1932 | Bader | 211/40 X |
| 1,914,564 | 6/1933 | Grandjean | 211/40 X |
| 2,275,664 | 3/1942 | Whitney | 211/40 |
| 3,391,792 | 7/1968 | Makar | 211/40 |
| 3,471,030 | 10/1969 | Nettekoven | 211/40 |
| 3,472,386 | 10/1969 | Osojnak | 211/40 |
| 3,338,421 | 8/1967 | Lyman | 211/41 |

*Primary Examiner*—Nile C. Byers, Jr.
*Attorney*—Pendleton, Neuman, Williams & Anderson

ABSTRACT: Elongate cradle members having arcuate support surfaces are formed so as to supportingly receive an outer peripheral portion of a magnetic tape container or the like. The cradles are pivotally mounted in axial alignment on a first transverse frame member traversing each cradle. Each cradle member may be pivotally moved out of axial alignment with the remaining cradles whereby the container supported thereby may be readily grasped and removed.

Inventor
Mark E. Larkin
By: Pendleton, Neuman, Seibold & Williams
Att'y's

Inventor
Mark E. Larkin
by: Pendleton, Neuman
Seibold & Williams
Atty's

Inventor
Mark E. Larkin
by: Pendleton, Neuman
Seibold & Williams
Att'ys

MAGNETIC TAPE HOLDER

BACKGROUND OF THE INVENTION

This invention relates to a holder for reeled materials such as magnetic tape or the like. With the increased use of computer and magnetic tape reels, the attendant problem of storing such reels has increased. This problem assumes major importance as storage space becomes increasingly valuable. Also, the value of expensive computer operations is oftentimes dependent upon the rapidity with which information stored on magnetic tape may be retrieved. The magnetic tape reels are most desirably stored so as to make optimum use of the available storage space, and in addition, should be readily obtainable when the required information is desired.

It is an objection of this invention, therefore, to provide a novel storage holder or rack for magnetic tape containers or the like which enables available storage space to be utilized to the optimum degree.

It is a further object of this invention to provide a novel storage rack which enables readily identifiable containers to be rapidly and easily selected from the rack in which disposed.

It is yet another object of this invention to provide a novel storage rack employing pivotal cradle members which may be locked in a fixed position so as to facilitate carrying of the rack and the containers mounted therein.

It is another object of this invention to provide a storage rack construction employing a number of varying pivoting cradle members which are adapted to store tape containers of varying design and configuration.

The above and other objects of this invention will become more apparent upon proceeding with the following description when read in the light of the accompanying drawings and the appended claims.

DESCRIPTION OF THE DRAWINGS

FIG. 4 is a top plan view of a holder constructed in accordance with this invention, employing a modified form of cradle member for holding a magnetic tape container or the like;

FIG. 5 is a sectional view taken on line 5—5 of FIG. 4;

FIG. 6 is a front elevational view of the holder assembly of FIG. 4;

FIG. 7 is a perspective view of a cradle member similar to that illustrated in FIG. 1, but modified in certain respects;

DESCRIPTION OF THE INVENTION

Figures 1, 2, 3:
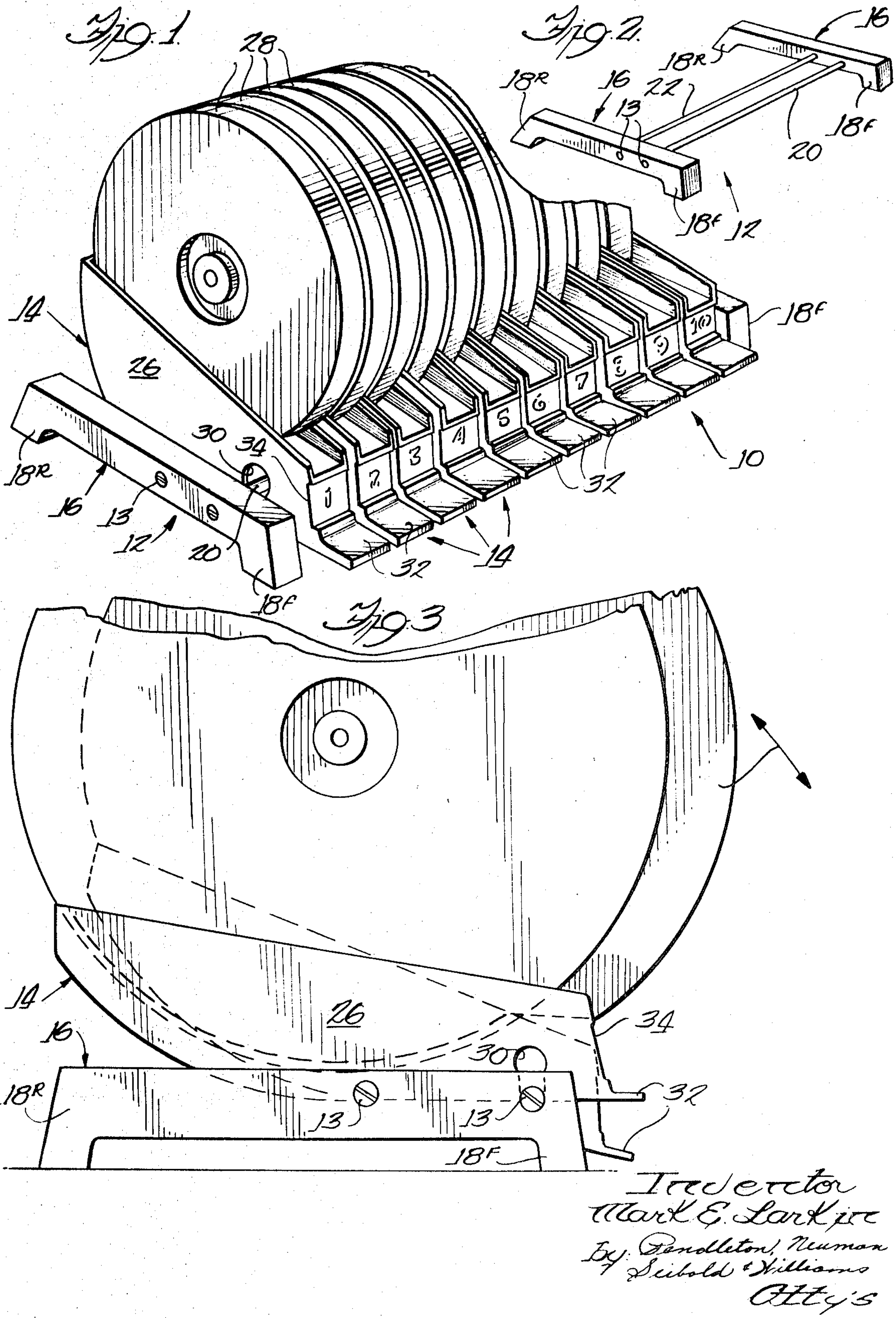
FIG. 1 is a fragmentary perspective view illustrating a holder for magnetic tape containers or the like constructed in accordance with this invention.
FIG. 2 is a perspective view of the supporting frame embodied in the holder of FIG. 1, illustrated on a reduced scale.
FIG. 3 is an enlarged side-elevational view illustrating the manner in which a cradle member employed in the holder of FIG. 1 may pivot a supported container between two positions.

Referring now more particularly to FIG. 1, a magnetic tape holder 10, composed of a supporting frame 12 and discrete, pivotally movable cradle members 14 is illustrated. Frame 12, as seen from FIG. 2, is seen to comprise parallel spacer members 16, having foot portions 18*r* and 18*f* adapted to engage a planar supporting surface. The parallel members 16 maintain in spaced parallel relation transversely extending cradle supports 20 and 22 which may comprise rods or tubes. Screws 13 engaging threads of opposed tapped ends of the supports 20 and 22 may be employed to maintain the supports and spacers in assembled relation.

As is seen from FIGS. 1 and 3, pivotally mounted on transversely extending support 22 are the cradles 14, having opposed upwardly and rearwardly inclined wall portions 26 which define a receiving pocket, or nest, in which a cylindrical magnetic tape container 28, or the like, may be readily received. It will be further seen from FIGS. 1 and 3 that when the cradles 14 are in their normal position of rest on the frame 12 of the holder 10, the centers of gravity of the containers 28 and the cradles 14 will be disposed between rear foot portions 18*r* of the spacer members 16 and the support 22.

Formed in each cradle 14 is a transverse arcuate slot 30 (see FIG. 3) which is adapted to permit passage of frame support 20. Each cradle 14 is able to pivot about frame support 22 into a downward position, illustrated in dotted lines in FIG. 3, whereat the upper portion of the arcuate slot 30 engages the frame support 20 which functions as a stop defining the lower end limit of the arcuate movement of the cradle and the container 28 held thereby.

As seen from FIGS. 1 and 3, in the normal position of rest the cradles and the containers held thereby are in axial alignment. During removal of a container 28, a desired tape container and its supporting cradle 14 are pivoted into the downward position, illustrated in dotted lines in FIG. 3.

To facilitate manual engagement with each cradle 14, a finger-engageable tab 32 projects from an end portion of each cradle disposed adjacent the arcuate slot 30. Each cradle is also possessed of a planar surface portion 34 which is adapted to receive an identifying indicium such as a number or letter to more easily effect retrieval of the desired container, each container 28 having a corresponding indicium. Planar surface 34 may have an identifying number pasted thereon or written thereon, or may be straddled by opposed, slotted cradle portions whereby an identification tab may be slidably received thereover.

Each cradle 14 is so designed that when tab 32 is urged into a lowered position as illustrated in dotted lines in FIG. 3 and the supported container removed, the center of gravity of the empty cradle will be so located relative to the supporting frame that, upon finger release, the cradle may readily return to its normal position of rest illustrated in FIG. 1. If the magnetic tape container 28 is allowed to remain in the cradle, the center of gravity of the combination of container and cradle will cause the cradle to remain in the lowered position illustrated in FIG. 3.

Cradle 14, because of its large, receiving nest area or pocket, is adapted to receive magnetic tape containers or other disclike containers of a variety of styles and configurations. It is seen from FIG. 3 that the end limit of the backward pivotal movement of the cradle 14 and its supported container 28 is defined by the bottom end portion of transverse arcuate slot 30.

Figures 4, 5, 6, 7:
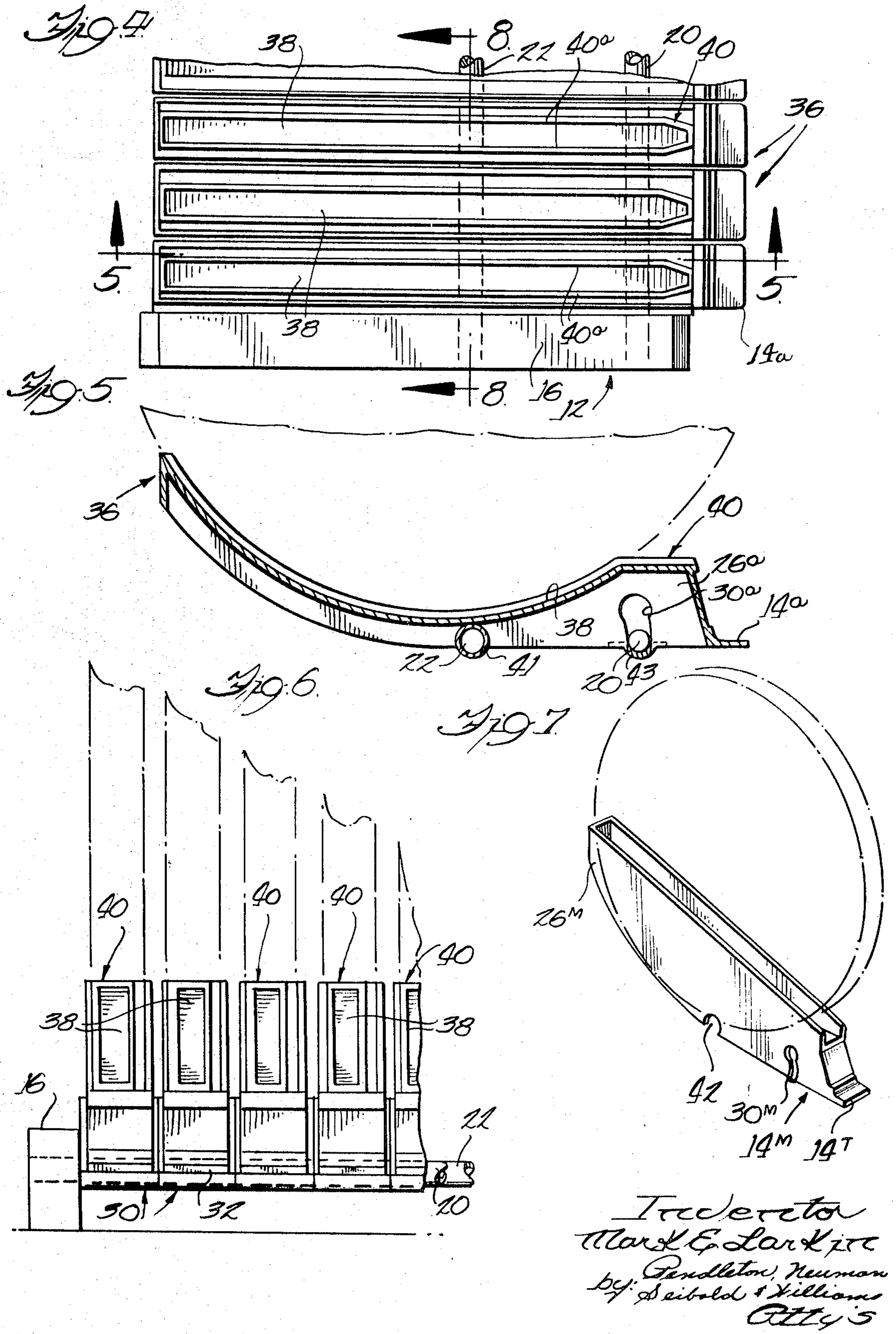

FIGS. 4 and 5 are illustrative of a modified type of cradle 36 which may be mounted on supporting frame 12 illustrated in FIG. 2. As will be more apparent from FIG. 5, each cradle 36 does not have pocket-defining sidewall portions, and employs a continuous rid 40 projecting from an upper surface portion 38 thereof. Each rib 40 may come to a point adjacent a finger-engaging tab portion 14*a* defining one end limit of each cradle 36. Opposed parallel longitudinal portions 40*a* of each continuous rib 40 define guideways or rails for guiding projecting tirelike portions 42 of a container, such as container 39 illustrated in dotted lines in FIG. 10, in the course of any rotatable movement of container 39 over surface 38 during pivoting of the cradle. A container need not rotate with the pivotal movement of the cradle upon which mounted, but need only move out of axial alignment with adjacent containers to facilitate removal. A container may thus frictionally engage a cradle supporting surface and be unmovable relative thereto until manually disengaged right therefrom.

The height that the rib 40 projects from the curved surface 38 of each cradle 36 is most apparent from FIG. 5. It will also be noted from FIG. 5 that each cradle 36 has imbedded therein and formed integrally therewith transverse collar members 41 comprising tubular sections adapted to receive the frame support 22 about which the cradles may pivot. Similarly, cradle 36 may have slots 30*a* formed in shallow wall portions 26*a* thereof, which employ at the bottoms thereof a stop 43 which may be secured to or imbedded in the body of the cradle 36. The stop 43 serves to limit the upward pivotal movement of the finger-engaged portion of cradle 36 about the support 22, and the upper portions of the slots 30*a* formed in opposed wall portions 26*a* of the cradle 36 may serve as a stop, limiting the downward movement of tab 14*a*.

Cradles 36 function similarly to cradle members 14 of FIG. 1; by moving tab 14*a* downwardly so as to bring a magnetic tape container or the like supported on the upper, elongate, curved surface thereof out of axial alignment, such container may be readily engaged by hand. Following release of such cradle 36, it will return to a position of rest in which the frame support 20 will abut against the stop 43 supported by the body of the cradle member 36. Collars 41 and stops 43 may be permanently secured to the bodies of cradles 36, or may be detachably connected as by a frictional engagement or the like.

FIG. 6 is a front elevational view of the holder portion illustrated in FIG. 4, and clearly illustrates the close-packed cradle and container arrangement. Since the cradles 36 as well as the cradles 14 of FIG. 1 are preferably formed of a smooth, lightweight plastic such as polyethylene, the same may be readily pivoted from their positions of rest with a minimum of friction with contiguous cradle members mounted on the same holder assembly. Collars 41 may project slightly beyond the cradle sides and function as cradle spacers.

FIG. 7 illustrates a modified cradle 14*m* which is substantially the same as cradle 14 illustrated in FIG. 1, with the exception that transverse opening 42 formed in a cradle base portion terminates at its lower end in a restricted neck portion. Opening 42 enables the cradle to be detachably connected to a transverse frame support such as support 22 of the frame 12, illustrated in FIG. 2. The cradles 14*m* are preferably formed of a plastic having some resiliency whereby the restricted neck portion of the opening 42 illustrated in FIG. 7 is able to interlock with the periphery of the transverse frame member 22, about which the illustrated cradle will pivot.

Similarly, slot 30*m* formed in the modified cradle member 14*m*, illustrated in FIG. 7, will have an open end limit defined by a restricted neck portion which enables the front portion of the illustrated cradle to snap over the transverse support 20 of frame 12, illustrated in FIG. 2. Instead of being formed about an arc with the opposed frame member 22 as a center, as is slot 30 of the cradle member 26 of FIGS. 1 and 3, slot 30*m* of modified cradle 14*m* of FIG. 7 has an enlarged terminal portion disposed at its upper end limit. The enlargement serves to lockingly engage a peripheral portion of the stop frame member 20 as the modified cradle 14*m* is pivoted into the end portion of its downward pivotal movement. The enlarged terminal portion, which is the upper portion of the slot 30*m* as viewed in FIG. 7, may serve to retain the modified cradle in a lowered position as may be desirable for purposes of transporting a holder assembly of magnetic tape containers and the holder. The upper portion of the modified slot 30*m* may thus function as a detent which provides a stable condition whereby the cradle may not pivotally move until released by application of an upwardly directed force to tab portion 14*t*.

Figures 8, 9, 10, 11:
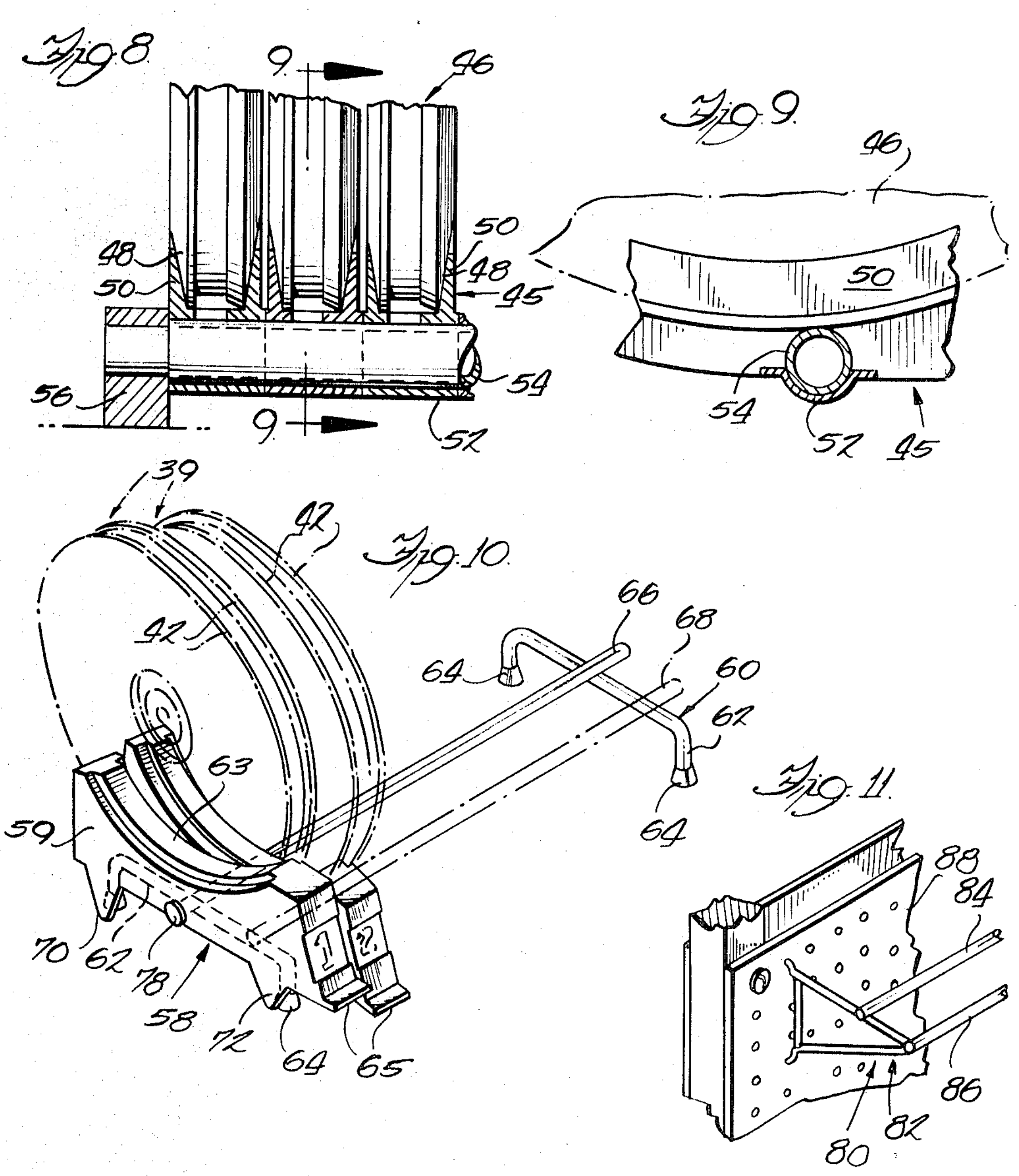
FIG. 8 is a fragmentary sectional view illustrating a further modified form of cradle member.
FIG. 9 is a sectional view taken on line 9—9 of FIG. 8.
FIG. 10 is a perspective view of a further modified form of cradle and frame employed in a holder construction, formed in accordance with this invention.
FIG. 11 is a fragmentary perspective view illustrating a simplified frame construction which may be employed in accordance with this invention illustrated on a reduced scale.

FIGS. 8 and 9 are illustrative of a cradle construction 45 adapted to hold a magnetic tape container 46 having chamfered peripheral edge portions. Containers 46 have chamfered edges 48 nestably received between the opposed cradle wall portions 50 which are appropriately relieved so as to snugly receive the edge portions 48.

FIGS. 8 and 9 also illustrate the manner whereby a transverse retaining member 52 may be imbedded in or cemented to the bottom of each cradle 46, such retaining member engaging a portion of the outer periphery of a transverse frame support 54 which is illustrated as an elongate tube in FIGS. 8 and 9. Frame support 54 comprising the pivot for cradle members 45, may be mounted at opposed end limits on pintles mounted in opposed spacer members 56, one of which is seen in FIG. 8.

FIG. 10 illustrative of a modified cradle member 58 having a curved, raised, elongate surface 63 straddled by recesses for receiving tires or rims 42 of containers 39. Supporting frame 60 employed with cradles 58 is of simple design comprising opposed, generally U-shaped members 62 having rubber tips 64 mounted on the distal ends thereof. The spacer members 62 are maintained in a spaced, erect condition by means of transverse tubular or rod member 66 which is suitably secured as by spot welding, clips or the like. Since the transverse frame member 66 is not disengageable from the spacer members 62, the opposed wall portions 59 of the cradles 58 may be provided with open-bottom openings such as the apertures 42 possessed by the modified cradle member 14*m* illustrated in FIG. 7.

The cradles 58 may be readily snapped in place on rod 66 by means of a central aperture 42 such as is illustrated in FIG. 7. Front legs 72 of cradles 58 are shorter than rear legs 70. The center of gravity of the cradles 58 is such that the normal cradle position of rest employs the rear feet 70 of the cradles as stops which engage a supporting planar surface. To move a selected tape container 39 out of axial alignment with remaining containers, tabs or finger-engaging portions 65 are urged downwardly until foot portions 72 engage such planar surface. Since a transverse rod similar to rod member 68 of the frame illustrated in dotted lines in FIG. 10 is not present in the construction thus far described, no slot need be formed in the cradles 58 to accommodate passage of such stop. For a more finished appearance, cap screws 78 may engage tapped end limits of the pivot rod 66 of the frame 60.

If desired, transverse frame member 68 may function as a locking detent in conjunction with a cradle slot not illustrated, similar to slot 30*m* illustrated in FIG. 7. If such locking slot is employed in cradles 58, the lower end limit of the pivotal movement of such cradles will not be determined by contact of the forward foot portions 72 with the planar surface on which supported, but rather the downward pivotal movement will be delimited by the upper end portion of such detent slot. In the latter construction, feet 72 may of course be eliminated.

FIG. 11 is illustrative of a simple rack frame 80 comprising opposed triangular members 82 between which are disposed parallel, cradle supports 84 and 86. The distal ends of the vertical wire member of the opposed triangular portions 82 of the frame 80 are readily mounted in position on pegboard 88, and a cradle member possessing open-bottom transverse openings and arcuate slots such as are possessed by the modified cradle 14*m* in FIG. 7 may be readily snapped in place on the frame member 80.

Also, it is possible to employ a cradle with frame 80 which is traversed by only one support such as support 84, and is so pivotally mounted that it may be pivoted downwardly so as to have an undersurface portion of the cradle member urged against support 86 illustrated in FIG. 11, such contact serving as a stop limiting the downward pivotal movement of the cradle.

It is apparent from the foregoing description of this invention that a variety of cradle members may be employed to accommodate the specific peripheral configuration of a magnetic tape container or other cylindrical container holding film, magnetic tape or the like. The transverse supports serving as pivots and stops for pivotally movable cradles may be permanently secured to spacer members as is illustrated in FIG. 10.

When the frame components are permanently attached to each other, as by spot welding or the like, the cradle members should be capable of being snapped in place on the support frame. The frame components may be detachably connected as is assembly 12 illustrated in FIG. 2 in which screw members 13 engage tapped end limits of the supports 22 and 20. In the course of assembling the cradle members 14 illustrated in FIG. 1 to the frame assembly 12 illustrated in FIG. 2, screw members 13 are disengaged from the end limits of the transverse frame members 22 and 20 thereby allowing the latter frame members to become disengaged from at least one spacer member 16. The cradle members may then be slid over the spaced parallel frame members 20 and 22, after which the detached spacer member 16 may be mounted in place over the distal ends of the elongate frame members and the screw members 13 replaced so as to lock the assembly together.

It is apparent from the foregoing description that cradles of varying design, adapted to hold magnetic tape containers or other cylindrical containers of varying design, may be employed on the same supporting frame if the frame components are able to be accommodated by the particular cradles employed. A still further cradle modification comprises the insertion of open-bottom metal clips into openings such as 42 and 30*m* of cradle 14*m* of FIG. 7 to engage transverse frame members. Such clips would possess a sectional configuration similar to that of opening 42 in FIG. 7. Such clips may be frictionally locked to cradle slot-defining portions. Elements 41 and 43 of the cradle 36 of FIG. 5 may similarly be resiliently locked in place.

It is also apparent from the drawing, as in FIG. 1, that the cradles may be placed in close-packed, side-by-side relation with no wasted intervening space. Cradles may be readily designed to accommodate any supported container or cylindrical member. Each cradle may be a solid molded piece with no intervening space between opposed, lower, cradle wall portions. Each cradle member is mounted so as to pivot from a position of rest for purposes of facilitating retrieval of the container supported thereon, after which the cradle will normally return to its position of rest. The various modified cradles and frame constructions illustrated are evidence of the fact that the various embodiments may be constructed with a minimum of manufacturing cost.

I claim:

1. A holder for magnetic tape containers or the like comprising two parallel elongate frame members, spacer means engaging opposed end portions of said frame members and maintaining said frame members in spaced relation, support means having a support surface adapted to supportingly engage a peripheral portion of a tape container, said support means extending at substantially right angles to said frame members and being pivotally mounted on one of said frame members; said support means being slotted for passage of the other of said frame members; the support means slot being substantially arcuate in configuration and formed along a radius having said one frame member as a center whereby said support means may pivot through an arc about said one frame member; the end limits of said pivotal movement being determined by engagement of said other frame member with the opposed ends of said arcuate slot.

2. The holder of claim 1 in which said support means is slidably movable along the length of said frame members; said frame members being of adequate length so as to have a plurality of support means mounted thereon in close-packed relation.

3. The holder of claim 1 in which said arcuate slot has an enlargement at one end limit thereof adapted to snugly engage said other of said frame means in interlocking engagement.

4. The holder of claim 1 in which said support means surface is formed in such manner as to enable a tape container or the like supported thereon to rotatably move along a length of said support surface in the course of pivotal movement thereof; said support surface being formed to guide said tape container or the like in the course of said rotatable movement.

5. The holder of claim 1 in which said support means has a manually engageable projecting tab to facilitate pivotal movement thereof.

6. The holder of claim 1 in which said support means resiliently engages said other frame member by means of portions of said support means defining said arcuate slot.